US009628558B2

(12) United States Patent
Wouhaybi

(10) Patent No.: US 9,628,558 B2
(45) Date of Patent: Apr. 18, 2017

(54) CREATING A WEB PROXY INSIDE A BROWSER

(71) Applicant: Rita H. Wouhaybi, Portland, OR (US)

(72) Inventor: Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/294,396

(22) Filed: Jun. 3, 2014

(65) Prior Publication Data

US 2015/0074193 A1 Mar. 12, 2015

Related U.S. Application Data

(63) Continuation of application No. 13/525,764, filed on Jun. 18, 2012, now Pat. No. 8,769,631.

(51) Int. Cl.
*G06F 17/30* (2006.01)
*H04L 29/08* (2006.01)
(Continued)

(52) U.S. Cl.
CPC ...... *H04L 67/104* (2013.01); *G06F 17/30905* (2013.01); *G06F 21/10* (2013.01);
(Continued)

(58) Field of Classification Search
CPC ...... H04M 3/537; H04M 7/0009; H04M 7/12; H04M 1/72561; H04M 3/4938;
(Continued)

(56) References Cited

U.S. PATENT DOCUMENTS 7,359,933 B1  4/2008  Polen et al.
7,975,058 B2  7/2011  Okmianski et al.
(Continued)

FOREIGN PATENT DOCUMENTS

CN    1567207 A    1/2005
CN    1870508 A    11/2006
(Continued)

OTHER PUBLICATIONS

International Search Report and Written Opinion received for PCT Patent Application No. PCT/US2013/043920, mailed on Aug. 21, 2013, 11 pages.
(Continued)

*Primary Examiner* — Kambiz Zand
*Assistant Examiner* — Abiy Getachew
(74) *Attorney, Agent, or Firm* — Jordan IP Law, LLC

(57) ABSTRACT

Systems and methods may provide for receiving a first request from a remote device for access to content on a second remote device, and invoking a proxy server embedded in an HTML5-compliant browser on a local device. Additionally, the first remote device may be provided with access to the content on the second remote device via the proxy server. Moreover, input may be received from a user interface of the local device, wherein a second request may be transmitted to the first remote device for access to content on a third remote device. In one example, the first remote device is unauthorized with respect to the content on the second remote device, and the local device is unauthorized with respect to the content on the third remote device.

15 Claims, 4 Drawing Sheets

(51) Int. Cl.
  *G06F 21/10* (2013.01)
  *H04L 29/06* (2006.01)

(52) U.S. Cl.
  CPC .......... *H04L 63/0281* (2013.01); *H04L 67/02* (2013.01); *H04L 67/06* (2013.01); *H04L 67/20* (2013.01); *H04L 67/2814* (2013.01); *H04L 63/08* (2013.01)

(58) Field of Classification Search
  CPC ............... G06F 17/30905; G06F 21/10; G06F 2221/2119; H04L 63/0281; H04L 63/08; H04L 67/02; H04L 67/06; H04L 67/104; H04L 67/20; H04L 67/2814
  USPC ............................................................ 726/4
  See application file for complete search history.

(56) References Cited

U.S. PATENT DOCUMENTS

| | | | |
|---|---|---|---|
| 8,011,002 B1 | 8/2011 | Upadhyay et al. | |
| 8,117,344 B2 | 2/2012 | Mendez et al. | |
| 8,127,033 B1 | 2/2012 | Newstadt et al. | |
| 8,891,765 B1* | 11/2014 | Dorwin | 380/201 |
| 2003/0061387 A1* | 3/2003 | Brown | H04L 63/02 709/246 |
| 2007/0202884 A1 | 8/2007 | Nykanen et al. | |
| 2009/0182844 A1 | 7/2009 | Barton et al. | |
| 2011/0138015 A1 | 6/2011 | Adriazola | |
| 2012/0204250 A1* | 8/2012 | Anderson | G06Q 10/107 726/9 |

FOREIGN PATENT DOCUMENTS

| | | |
|---|---|---|
| CN | 1960304 A | 5/2007 |
| WO | 2013/191881 A1 | 12/2013 |

OTHER PUBLICATIONS

Wikipedia, "Roku" retrieved from Internet Archive Wayback Machine https://web.archive.org/web/20120527120319/http://en.wikipedia.lorg/wiki/Roku, May 27, 2012, 13 pages.
Wikipedia, "Hulu" retrieved from Internet Archive Wayback Machine https://web.archive.org/web/20120524143655/https://en.wikipedia.org/wiki/Hulu, May 24, 2012, 29 pages.
Wikipedia, "Xbox 360" retrieved from Internet Archive Wayback Machine https://web.archive.org/web/20120523060148/http://en.wikipedia.org/wiki/Xbox_360, May 23, 2012, 30 pages.
Wikipedia, "MeshCentral" retrieved from Internet Archive Wayback Machine https://web.archive.org/web/20120509131712/https://www.meshcentral.com/, May 9, 2012, 1 page.
Wikipedia, "Chrome Remote Desktop app" retrieved from Internet Archive Wayback Machine https://web.archive.org/web/20140602005017/https://support.google.com/chrome/answer/1649523, Jun. 2, 2014, 8 pages.
Wikipedia, "Remote Desktop Services" retrieved from Internet Archive Wayback Machine https://web.archive.org/web/20120523061310/http://en.wikipedia.org/wiki/Remote_Desktop_Services, May 23, 2012, 14 pages.
European Search Report for EP Patent Application No. 13807197, dated Feb. 4, 2016, 9 pages.
Office Action for EP Patent Application No. 13807197.2, dated Feb. 14, 2017, 4 pages.

* cited by examiner

CREATING A WEB PROXY INSIDE A BROWSER

CROSS-REFERENCING PARAGRAPH

The present application is a continuation application of prior U.S. application Ser. No. 13/525,764, filed on Jun. 18, 2012, entitled "CREATING A WEB PROXY INSIDE A BROWSER".

BACKGROUND

Embodiments generally relate to the sharing of web-based content between devices. More particularly, embodiments relate to the use of a proxy server that is embedded in a browser to share content between devices.

Certain web-based content may have access restrictions due to security and/or monetization concerns. In such a case, express authorization may need to be given to a particular device before a web server will permit access to the content in question. End users, however, may often have several devices such as a desktop computer, notebook computer, smart phone, etc., wherein each device may need to be individually authorized in order to receive the content from the web server.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
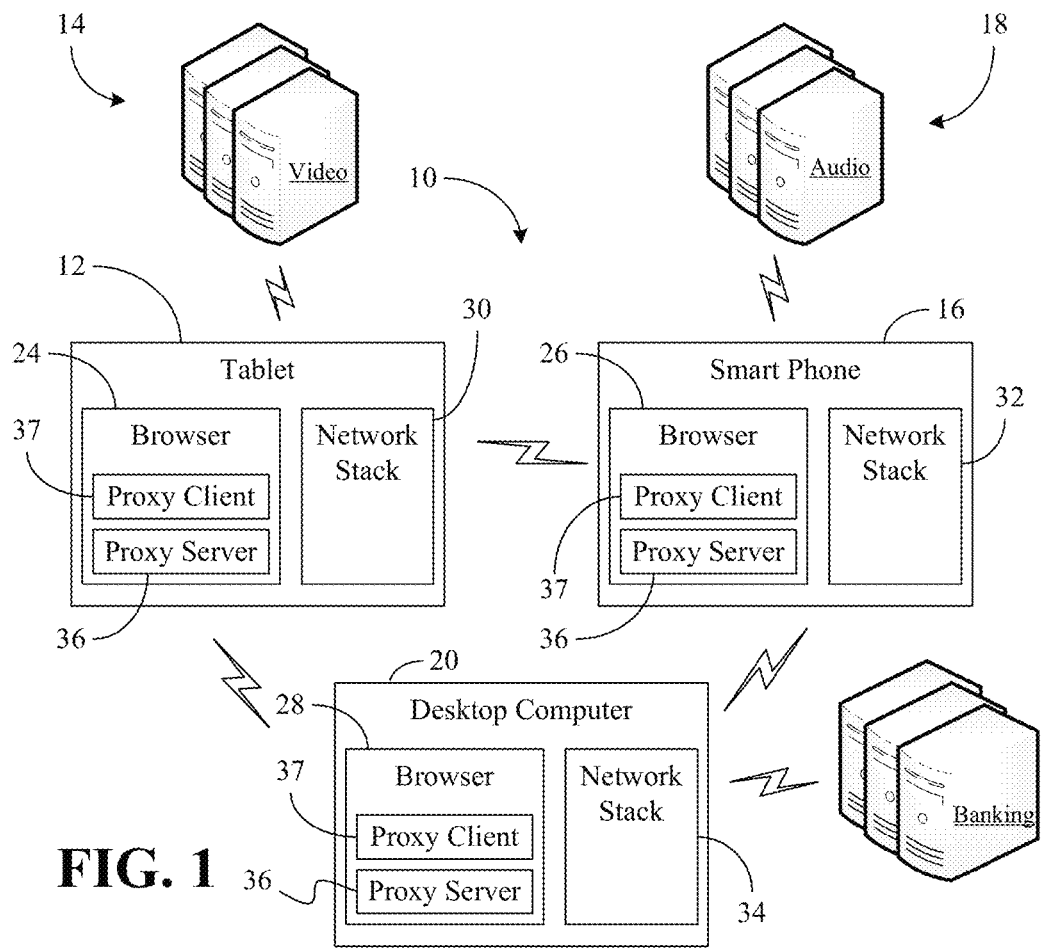
FIG. 1 is a block diagram of an example of a private proxy network according to an embodiment.

Turning now to FIG. 1, a personal proxy network 10 (e.g., personal cloud) is shown in which browser embedded proxy servers and clients may be used to share web-based content among devices in the network 10. In the illustrated example, a tablet 12 has access to (e.g., is authorized with respect to) content on a first web server 14, a smart phone 16 has access/authorization to content on a second web server 18, and a desktop computer 20 has access/authorization to a third web server 22.

For example, the content on the first web server 14 could include a video stream of a movie or television show, wherein a provider of the video stream has authorized the tablet 12 to receive the video stream. In the illustrated example, the tablet 12 receives the video stream via a browser 24 and a network stack 30 on the tablet 12. Similarly, the content on the second web server 18 may include an audio stream of a subscription-based radio program, wherein a provider of the audio stream has authorized the smart phone 16 to receive the audio stream. In the illustrated example, the smart phone 16 receives the audio stream via a browser 26 and a network stack 32 on the smart phone 16. Additionally, the content on the third web server 22 may include online banking information, wherein a financial institution associated with the online banking information has authorized the desktop computer 20 to receive the online banking information. In the illustrated example, the desktop computer 20 receives the online banking information via a browser 28 and a network stack 34 on the desktop computer 20. The illustrated network stacks 30, 32, 34 include the protocols involved in transferring information between the network-related hardware and software layers of the respective devices in the personal proxy network 10.

Of particular note is that the provider of the content on the first web server 14 has not expressly authorized either the smart phone 16 or the desktop computer 20 to access the content on the first web server 14, in the example shown. Similarly, the provider of the content on the second web server 18 has not expressly authorized either the tablet 12 or the desktop computer 20 to access the content on the second web server 18, and the provider of the content on the third web server 22 has not expressly authorized either the tablet 12 or the smart phone 16 to access the content on the third web server 22, in the example shown. The illustrated approach, however, uses a proxy server 36 embedded in the browsers 24, 26, 28 to share the content on the servers 14, 18, 22 across each of the devices in the network 10, wherein the devices accessing the content may use proxy clients 37 also embedded in the browsers 24, 26, 28 to display, output and/or otherwise experience the content. Authorization from the web servers 14, 18, 22 could be in the form of cookies stored on the authorized machine or even requiring the connection to the content to be made through an internal firewalled network.

Thus, the web servers 14, 18, 22 may be considered "producer devices" in the sense that they may act as web-based sources of content, wherein the tablet 12, smart phone 16 and desktop computer 20 may be considered "consumer devices" to the extent that they are able to access the content produced by the web servers 14, 18, 22. Moreover, the tablet 12, smart phone 16 and desktop computer 20 may also be considered "proxy devices" to the extent that they are authorized to access the content and enable each other to access otherwise inaccessible content on the web servers 14, 18, 22.

For example, the browser 24 on the tablet 12 (acting as a proxy device) may use the proxy server 36 to stream the aforementioned video content from the first web server 14 (a producer device) to the smart phone 16 and/or the desktop computer 20 (acting as consumer devices), the browser 26 on the smart phone 16 (acting as a proxy device) may use the proxy server 36 to stream the aforementioned audio content from the second web server 18 (a producer device) to the tablet 12 and/or the desktop computer 20 (acting as consumer devices), and the browser 28 on the desktop computer 20 (acting as a proxy device) may use the proxy server 36 to enable the tablet 12 and/or the smart phone 16 (acting as consumer devices) to access the aforementioned online banking information on the third web server 22 (a producer device). The content sharing may be on a one-to-one, one-to-many, or many-to-one basis.

More particularly, the illustrated proxy server 36 in the browser 24 communicates with the network stack 30 of the tablet 12, the proxy server 36 in the browser 26 communicates with the network stack 32 of the smart phone 16, and the proxy server 36 communicates with the network stack 34 of the desktop computer 20, in the example shown. In one example, the browsers 24, 26, 28 are HTML5 (Hypertext Markup Language 5, e.g., HTML5 Editor's Draft 8 May 2012, W3C) compliant, and the proxy servers 36 and clients 37 communicate according to the HTML5 language, wherein the HTML5 language exposes more device information to the browser than available under conventional virtual machine "sandbox" approaches.

Moreover, the devices in the personal proxy network 10 do not need to be located in the same physical location during proxy operation. In addition, configuration technologies such as Zeroconf and Bonjour might be used to connect the devices to one another seamlessly, wherein once the devices are enrolled in the personal proxy network, they may keep track of one another. Thus, if the user carries the smart phone 16 to the gym and wants to watch a video that only the tablet 12 has access to while on the treadmill, the smart phone 16 is able to connect to the browser-embedded proxy server 36 in the tablet 12 in order to access the video. Similarly, on the user's commute home from work that day, the smart phone 16 could be used to access his or her bank account via the browser-embedded proxy server 36 in the desktop computer 20, which may be physically located at home. Accordingly, TCP/IP (transfer control protocol/Internet protocol) requests may be channeled between the financial institution's server 22 and the smart phone 16 via the proxy server 36 running in the browser 28 of the desktop computer 20.

Figure 2:
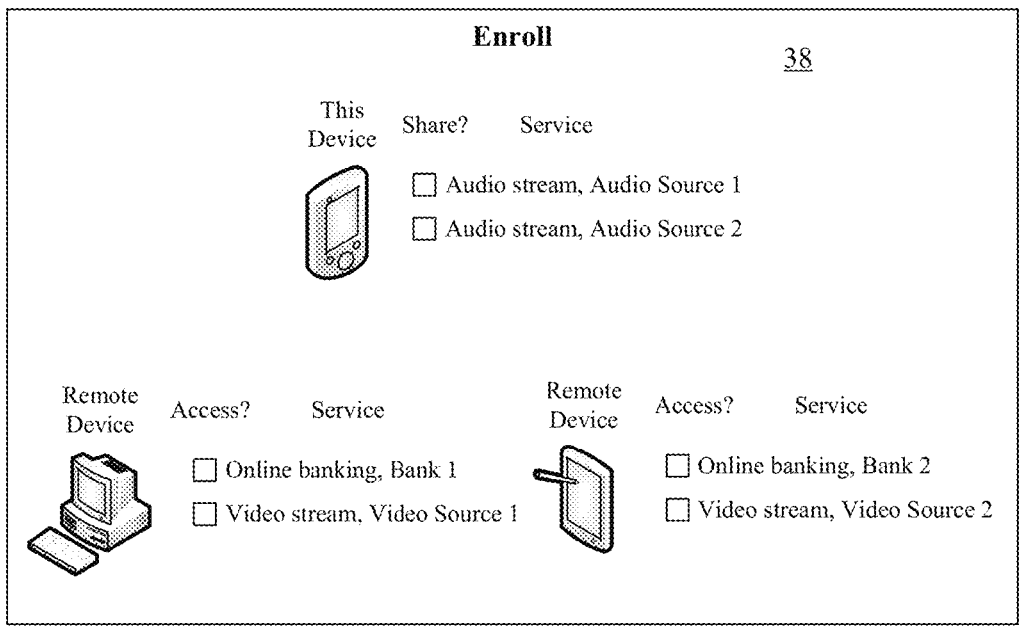
FIG. 2 is a screen diagram of an example of an enrollment interface according to an embodiment.

FIG. 2 shows an enrollment interface 38 that may be used to enroll a local device such as the smart phone 16 (FIG. 1) in a personal proxy network such as the personal proxy network 10 (FIG. 1), already discussed. In the illustrated example, the local device is able to act as a proxy device with regard to an audio stream from a first audio source ("Audio Source 1") and an audio stream from a second audio source ("Audio Source 2"), wherein the audio streams may be obtained from remote devices such as web servers (e.g., producer devices). Thus, the user may be given the option to share these audio streams with the other devices in the personal proxy network. The enrollment interface 38 also presents the user with the other devices in the personal proxy network, as well as the content available through those devices. In particular, a desktop computer is able to act as a proxy device with regard to online banking content from a first financial institution ("Bank 1") and a video stream from a first video source ("Video Source 1"), in the example shown. Additionally, a tablet may be able to act as a proxy device with regard to online banking content from a second financial institution ("Bank 2") and a video stream from a second video source ("Video Source 2").

A similar type of interface may also be used to add, modify or delete available services. For example, the user may chose to open such an interface on the smart phone 126 and add a video streaming service, change the source of the first audio streaming service, or delete the second audio streaming service. The same might be done for all of the devices in the personal proxy network 10.

Figure 3:
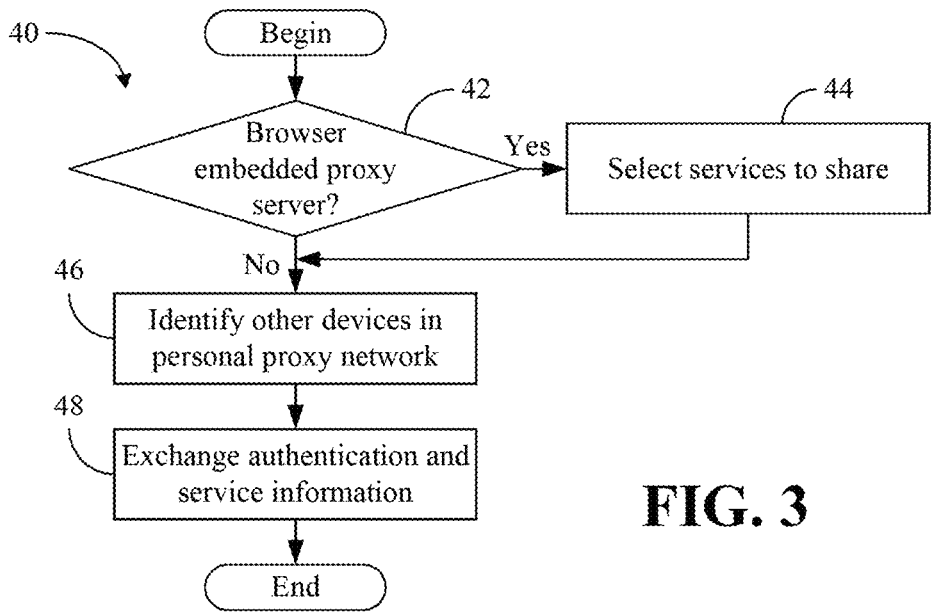
FIG. 3 is a flowchart of an example of a method of enrolling a device in a personal proxy network according to an embodiment.

Turning now to FIG. 3, a method 40 of enrolling a local device in a personal proxy network is shown. The method 40 may be implemented as a set of logic and/or firmware instructions stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 40 may be written in any combination of one or more programming languages, including an object oriented programming language such as C++ or the like and conventional procedural programming languages, such as the "C" programming language or similar programming languages.

Illustrated processing block 42 determines whether the local device has a browser with an embedded proxy server. If so, one or more services to share may be selected at block 44, wherein the services may correspond to web-based content, e-commerce (electronic commerce) transactions, online portals, and so forth. Block 46 may provide for identifying other devices in a personal proxy network, wherein authentication information (e.g., encryption keys, digital certificates) and service information (e.g., available service listings) may be exchanged with the identified devices at block 48. The authentication information may be used to authenticate devices as services are subsequently requested on the personal proxy network.

Figure 4:
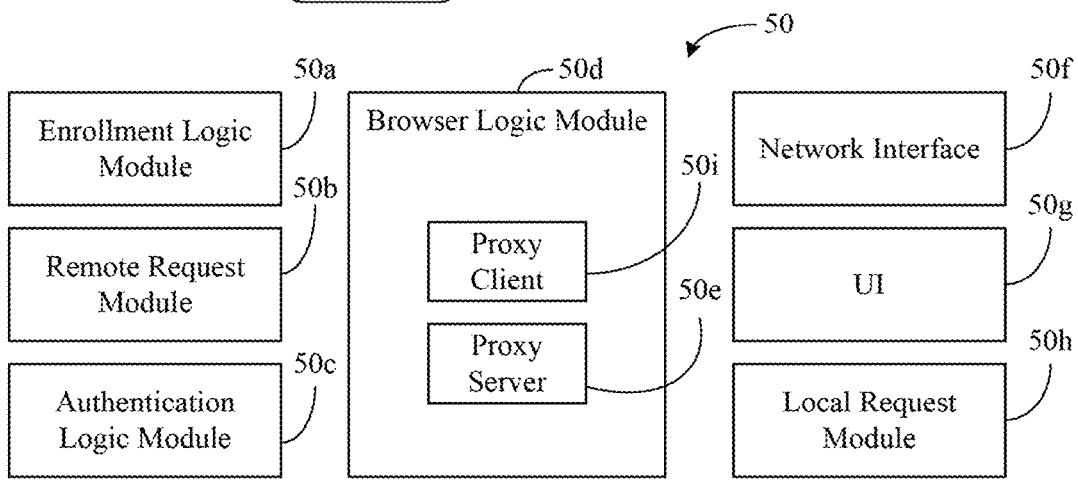
FIG. 4 is a block diagram of an example of a logic architecture according to an embodiment.

FIG. 4 shows a logic architecture 50 (50a-50i) that is able to support content/service sharing as described herein. In the illustrated example, an enrollment logic module 50a enrolls a local device in a personal proxy network, and a remote request module 50b is configured to receive requests from remote devices (e.g., consumer devices) in a personal proxy network for access to content on other remote devices such as remote web servers (e.g., producer devices). In addition, an authentication logic module 50c may authenticate the consumer devices (e.g., based on previously exchanged encryption keys, digital certificates, etc.), and a browser logic module 50d (e.g., running in the background) may invoke an embedded proxy server 50e, wherein the proxy server 50e may provide the consumer devices with access to the content on the producer devices. As already noted, the proxy server 50e may be configured to communicate according to a language such as an HTML5 language. Moreover, the proxy server 50e may operate as a point-to-point or overlay proxy. In one example, the proxy server 50e uses a network stack and a network interface 50f to provide the consumer devices with access to the requested content.

Additionally, the illustrated logic architecture 50 includes a user interface (UI) 50g that receives input from a user, and a local request module 50h that transmits requests to remote devices in the personal proxy network (e.g., proxy devices) for access to content on other remote devices (e.g., producer devices), wherein the local device is unauthorized with respect to the content on the other remote devices. Accordingly, a browser embedded proxy client 50i and the network interface 50f may also be used to receive requested content via proxy servers on other remote devices in the personal proxy network.

Figure 5:
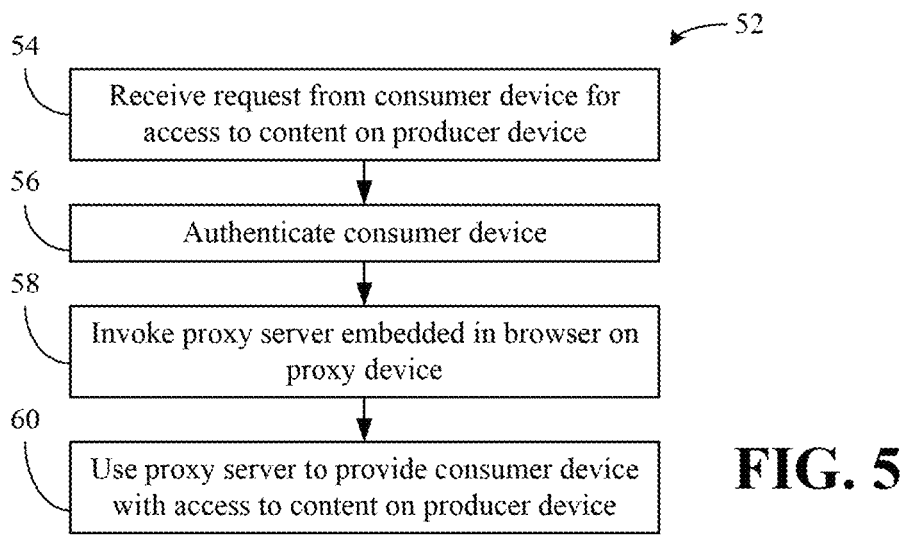
FIG. 5 is a flowchart of an example of a method of providing access to content according to an embodiment.

FIG. 5 shows a method 52 of providing access to content. The method 52 may be implemented as a set of logic and/or firmware instructions stored in a machine- or computer-readable storage medium such as RAM, ROM, PROM, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block receives a request from a consumer device for access to content on a producer device, wherein the consumer device may be authenticated at block 56. Additionally, block 58 may invoke a proxy server embedded in a browser on the proxy device. The proxy server may be used at block 60 to provide the consumer device with access to the content on the producer device.

Figure 6:
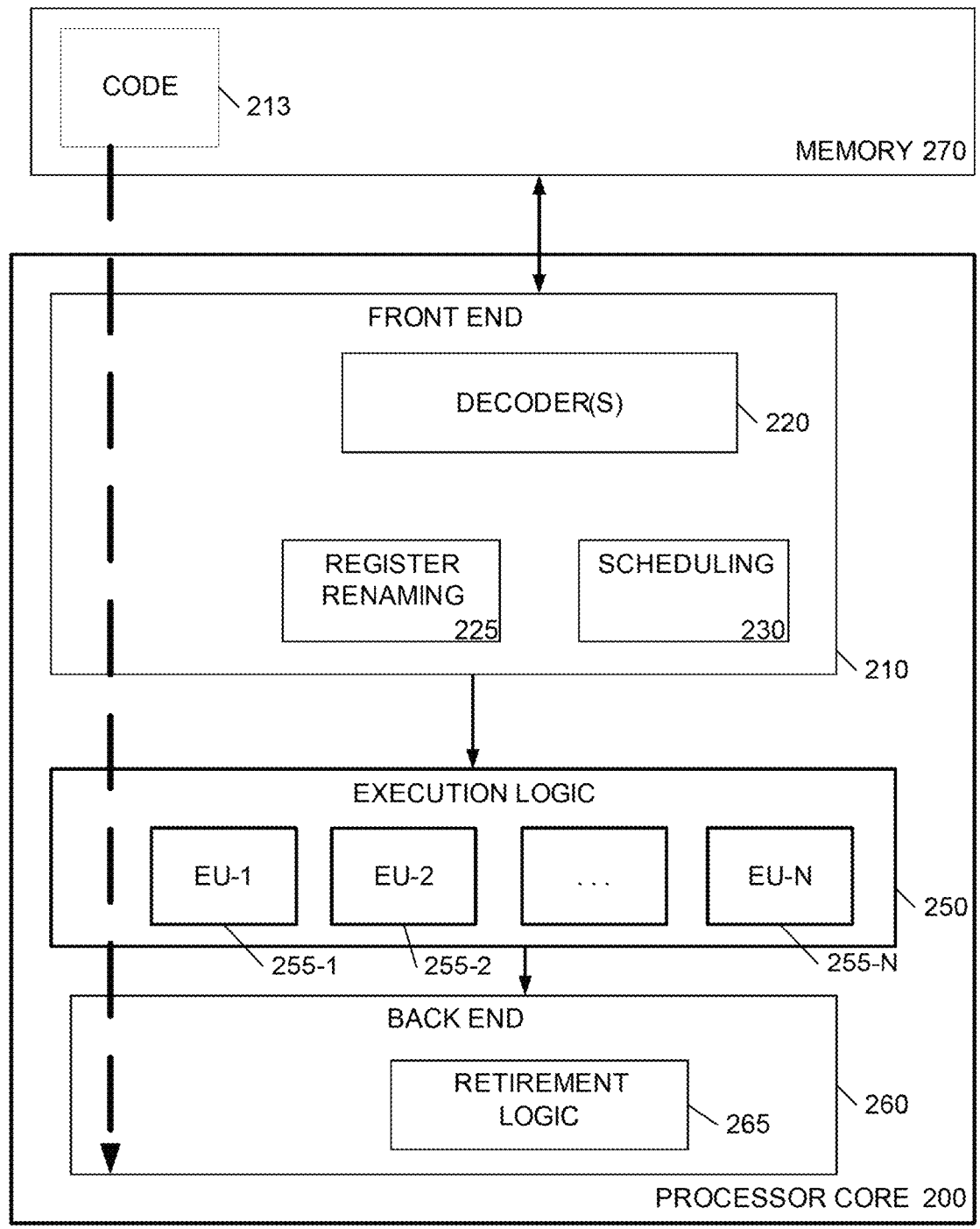
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 50 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
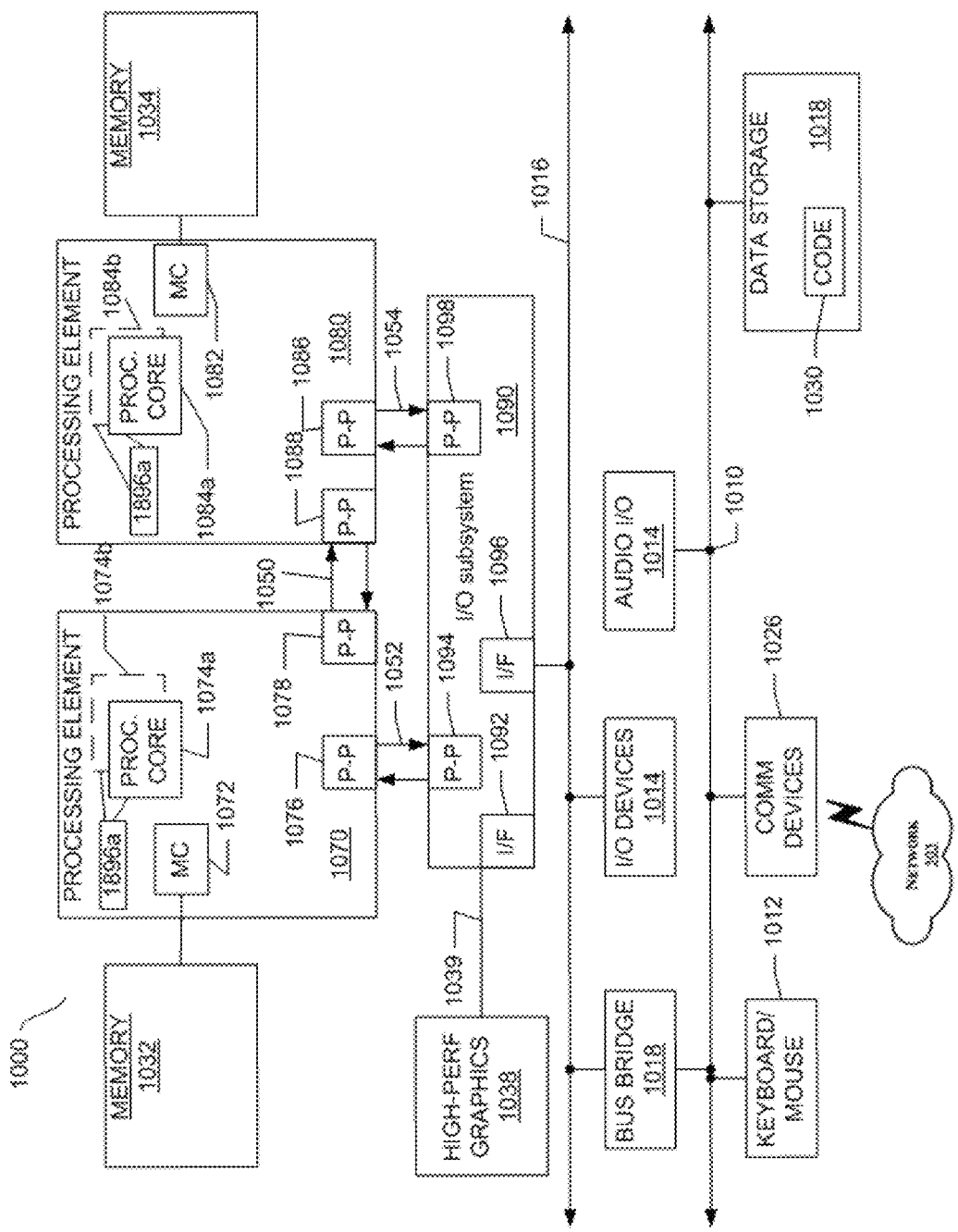
FIG. 7 is a block diagram of an example of a system according to an embodiment.

Referring now to FIG. 7, shown is a block diagram of a system embodiment 1000 in accordance with an embodiment of the present invention. Shown in FIG. 7 is a multi-processor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 6.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 7, various I/O devices 1014 may be coupled to the first bus 1016, along with a bus bridge 1018 which may couple the first bus 1016 to a second bus 1010. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network, 503), and a data storage unit 1018 such as a disk drive or other mass storage device which may include code 1030, in one embodiment. The code 1030 may include instructions for performing embodiments of one or more of the methods described above. Thus, the illustrated code 1030 may implement the logic architecture 50 (FIG. 4) and could be similar to the code 213 (FIG. 6), already discussed. Further, an audio I/O 1024 may be coupled to second bus 1020.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Embodiments may include an apparatus having a remote request module to receive a first request from a first remote device for access to content on a second remote device, wherein the first remote device is initially unauthorized with respect to the content on the second remote device. The apparatus may also include a browser logic module to invoke a browser embedded proxy server on the apparatus, wherein the browser embedded proxy server is to provide a browser embedded proxy client on the first remote device with access to the content on the second remote device.

Additionally, the proxy server may use a network stack associated with the apparatus to provide the browser embedded proxy client on the first remote device with access to the content on the second remote device.

The apparatus may also include an authentication logic module to authenticate the first remote device in response to the first request.

Moreover, the apparatus may include an enrollment logic module to enroll the apparatus in a personal proxy network associated with the first remote device.

In addition, the browser embedded proxy server may stream the content on the second remote device to the browser embedded proxy client on the first remote device.

The apparatus may also include a user interface to receive input from a ser, and a local request module to transmit a second request to the first remote device for access to content on a third remote device, wherein the apparatus is initially unauthorized with respect to the content on the third remote device.

Moreover, the apparatus may include a network interface to receive access to the content on the third remote device via a browser embedded proxy server on the first remote device.

Additionally, the proxy server in any one of the aforementioned apparatus embodiments may communicate according to an HTML5 language.

Embodiments may also include at least one computer-readable medium having one or more instructions that when executed on a processor, configure a local device to receive a first request from a first remote device for access to content on a second remote device, wherein the first remote device is unauthorized with respect to the content on the second remote device. The instructions when executed, may further configure the local device to invoke a browser embedded proxy server on the local device, wherein the local device is authorized with respect to the content on the second remote device, and provide a browser embedded proxy client on the first remote device with access to the content on the second remote device via the browser embedded proxy server on the local device.

In addition, the instructions when executed may configure the local device to use a network stack associated with the local device to provide the browser embedded proxy client on the first remote device with access to the content on the second remote device.

Moreover, the instructions when executed may configure the local device to authenticate the first remote device in response to the first request.

Additionally, the instructions when executed may configure the local device to enroll the local device in a personal proxy network associated with the first remote device.

In addition, the instructions when executed configure the local device to stream the content on the second remote device to the browser embedded proxy client on the first remote device via the browser embedded proxy server on the local device.

Moreover, the instructions when executed may configure the local device to receive input from a user interface of the local device, and transmit a second request to the first remote device for access to content on a third remote device, wherein the local device is initially unauthorized with respect to the content on the third remote device.

Additionally, the instructions when executed may configure the local device to receive access to the content on the third remote device via a browser embedded proxy server on the first remote device.

In addition, in any one of the aforementioned at least one computer-readable medium, the proxy server may communicate according to an HTML5 language.

Additionally, embodiments may include a system having a producer device with content, and a consumer device including a browser embedded proxy client, the consumer device to issue a first request for access to the content on the producer device, wherein the consumer device is initially unauthorized with respect to the content on the producer device. The system may also have a proxy device with an enrollment module to enroll the proxy device in a personal proxy network associated with the consumer device, and a remote request module to receive the first request, wherein the proxy device is to be authorized with respect to the content on the producer device. The proxy device may also include an authentication logic module to authenticate the consumer device in response to the first request, and a browser logic module to invoke a browser embedded proxy server on the proxy device. The browser embedded proxy server may use a network stack on the proxy device to stream the content from the producer device to the browser embedded proxy client on the consumer device.

Moreover, the proxy device may further include a user interface to receive input from a user, and a local request module to transmit a second request to the consumer device for access to content on a second producer device, wherein the proxy server is initially unauthorized with respect to the content on the second producer device.

The consumer device may also include a browser embedded proxy server, wherein the proxy device further includes a browser embedded proxy client to receive access to the content on the second producer device via the browser embedded proxy server on the consumer device.

In addition, the proxy server of any one of the aforementioned system embodiments may communicated according to an HTML5 language.

Other embodiments may include a method in which a first request is received from a first remote device for access to content on a second remote device, wherein the first remote device is unauthorized with respect to the content on the second remote device, and invoking a browser embedded proxy server on a local device, wherein the local device is authorized with respect to the content on the second remote device. The method may also involve providing a browser embedded proxy client on the first remote device with access to the content on the second remote device via the browser embedded proxy server on the local device.

Additionally, a network stack associated with the local device may be used to provide the browser embedded proxy client on the first remote device with access to the content on the second remote device.

Moreover, the method may involve authenticating the first remote device in response to the first request.

The method may also involve enrolling the local device in a personal proxy network associated with the first remote device.

In addition, providing the first remote device with access to the content on the second remote device may include streaming the content to the browser embedded proxy client on the first remote device.

Additionally, the method may include receiving input from a user interface of the local device, and transmitting a second request to the first remote device for access to content on a third remote device, wherein the local device is unauthorized with respect to the content on the third remote device.

Moreover, the method may include receiving access to the content on the third remote device via a browser embedded proxy client on the local device and a browser embedded proxy server on the first remote device.

The proxy server of any one of the aforementioned method embodiments may also communicate according to an HTML5 language.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A method comprising:
   identifying web content from a first web source that is accessible by a web browser of a first device and web content from a second web source that is accessible by a web browser of a second device, wherein the first device and the second device each include a proxy server to form a personal proxy network;
   acquiring the web content from the first web source by the web browser of the first device for use by the second device when an option to exchange, via the proxy server of the first device, the web content from the first web source is selected, and acquiring the web content from the second web source by the web browser of the second device for use by the first device when an option to exchange, via the proxy server of the second device, the web content from the second web source is selected; and
   exchanging one or more of the web content from the first web source and the web content from the second web source according to a hypertext markup language 5 (HTML5) language.

2. The method of claim 1, further including displaying one or more of a content source and a content type to identify the web content from the first web source and the web content from the second web source.

3. The method of claim 1, further including providing one or more of an option to add a web content service, an option to modify the web content service, and an option to delete the web content service.

4. The method of claim 3, further including one or more of:
   changing a web content source to modify a web content streaming service when the option to modify the web content service is selected; and
   deleting the web content source to delete the web content streaming service when the option to delete the web content service is selected.

5. The method of claim 1, further including:
   forwarding the web content from the first web source via the proxy server of the first device to the second device in response to a request by the second device; and
   receiving the web content from the second web source via the second device at the first device in response to a request by the first device.

6. The method of claim 1, further including:
   acquiring the web content from the first web source when an option to share the web content from the first web source is selected; and
   acquiring the web content from the second web source when an option to access the web content from the second web source is selected.

7. At least one non-transitory computer-readable medium including comprising one or more instructions which when executed on a processor cause the processor to:
   identify web content from a first web source that is to be accessible by a web browser of a first device and web content from a second web source that is to be accessible by a web browser of a second device, wherein the first device and the second device are each to include a proxy server to form a personal proxy network;
   acquire the web content from the first web source by the web browser of the first device for use by the second device when an option to exchange, via the proxy server of the first device, the web content from the first web source is to be selected, and acquire the web content from the second web source by the web browser of the second device for use by the first device when an option to exchange, via the proxy server of the second device, the web content from the second web source is to be selected; and
   exchange one or more of the web content from the first web source and the web content from the second web source according to a hypertext markup language 5 (HTML5) language.

8. The at least one non-transitory computer-readable medium of claim 7, wherein the instructions when executed configure the processor to display one or more of a content source and a content type to identify the web content from the first web source and the web content from the second web source.

9. The at least one non-transitory computer-readable medium of claim 7, wherein the instructions when executed configure the processor to provide one or more of an option to add a web content service, an option to modify the web content service, and an option to delete the web content service.

10. The at least one non-transitory computer-readable medium of claim 7, wherein the instructions when executed configure the processor to forward the web content from the first web source via the proxy server of the first device to the second device in response to a request by the second device, and receive the web content from the second web source via the second device at the first device in response to a request by the first device.

11. The at least one non-transitory computer-readable medium of claim 7, wherein the instructions when executed configure the processor to acquire the web content from the first web source when an option to share the web content from the first web source is to be selected, and acquire the web content from the second web source when an option to access the web content from the second web source is to be selected.

12. An apparatus comprising:
a network interface to form a personal proxy network including a first device and a second device that are each to include a proxy server;
a first logic module to identify web content from a first web source that is to be accessible by a web browser of the first device and web content from a second web source that is to be accessible by a web browser of the second device; and
a second logic module to acquire the web content from the first web source by the web browser of the first device for use by the second device when an option to exchange, via the proxy server of the first device, the web content from the first web source is to be selected, acquire the web content from the second web source by the second device for use by the first device when an option to exchange, via the proxy server of the second device, the web content from the second web source is to be selected, and exchange one or more of the web content from the first web source and the web content from the second web source according to a hypertext markup language 5 (HTML5) language.

13. The apparatus of claim 12, further including a user interface to display one or more of a content source and a content type to identify the web content from the first web source and the web content from the second web source.

14. The apparatus of claim 12, wherein the second logic module is to forward the web content from the first web source via the proxy server of the first device to the second device in response to a request by the second device, and receive the web content from the second web source via the second device in response to a request by the first device.

15. The apparatus of claim 12, wherein the second logic module is to acquire the web content from the first web source when an option to share the web content from the first web source is to be selected, and acquire the web content from the second web source when an option to access the web content from the second web source is to be selected.

* * * * *